United States Patent

[11] 3,603,997

| [72] | Inventors | Jerome J. Brouwer<br>Irving;<br>Gerald C. Church, Richardson; Tom C. Morris, Dallas, all of, Tex. |
|---|---|---|
| [21] | Appl. No. | 822,644 |
| [22] | Filed | May 7, 1969 |
| [45] | Patented | Sept. 7, 1971 |
| [73] | Assignee | Texas Instruments Incorporated<br>Dallas, Tex. |

[54] ELECTRONIC RESOLVED SWEEP SIGNAL GENERATOR
18 Claims, 3 Drawing Figs.

[52] U.S. Cl. .................................................... 343/10,
340/198, 343/11
[51] Int. Cl. ...................................................... G01s 7/10,
G01s 7/12
[50] Field of Search .......................................... 340/198;
343/10, 11; 330/147

[56] References Cited
UNITED STATES PATENTS

| 2,529,876 | 11/1950 | Jofeh | 343/11 X |
| 2,727,224 | 12/1955 | Adkins et al. | 340/198 |
| 2,900,632 | 8/1959 | Arkus | 343/10 |
| 3,377,589 | 4/1968 | Materer et al. | 343/11 |
| 3,395,354 | 7/1968 | Maupin | 343/11 X |
| 3,478,357 | 11/1969 | Bacon | 343/10 |

*Primary Examiner*—Malcolm F. Hubler
*Attorneys*—James O. Dixon, Andrew M. Hassell, Hal Levine, Mel Sharp and Rene E. Grossman

ABSTRACT: To display radar data on the face of a cathode-ray tube or other display device, it is necessary to generate product functions of the sine and the cosine components of the antenna position angle times the radar-sweep function. Both the sine product function and the cosine product function are electronically generated in respective multipliers. Each multiplier consists of a first differential amplifier pair coupled push-pull to a second differential amplifier pair. To minimize the effect of line voltage variation on the product functions, the sweep voltage is corrected prior to multiplication with the sine and cosine components in accordance with line voltage variation.

PATENTED SEP 7 1971　　3,603,997

ELECTRONIC RESOLVED SWEEP SIGNAL GENERATOR

This invention relates to generating resolved sweep signals, and more particularly to the generation of resolved sweep signals by means of electronic multiplication.

In a display of angular sweep radar data on the face of a CRT or DVST, a sine function deflects the display beam on the tube horizontally and a cosine function deflects the display beam on the tube vertically. To obtain accurate radar target presentations on such displays, it is necessary that the resolved vertical and horizontal sweep functions be generated from sources that reproduce the basic sweep functions. This requires that the resolver have sufficient frequency response to accurately respond to the necessary sweep functions.

Heretofore, the sine function and the cosine function for radar displays were usually generated by mechanical means such as the sine-cosine potentiometer or electro mechanical resolvers A sine-consine potentiometer includes a rotary component utilizing a resistance material distributed sinusoidally with respect to a wiper arm position. Like all potentiometers, the sine-cosine potentiometer degrades in performance with gear. After a relatively short period of time, discontinuities occur and noise appears on the output which results in an inaccurate target display that will be difficult if not impossible to correctly interpret. Unlike electromechanical resolvers, the frequency response of a potentiometer is generally acceptable; the main disadvantage is a low-operational life span.

Electromechanical resolvers are magnetic transducers that can be simply described as rotary mutually coupled transformers. Although the frequency response is inacceptable for highly accurate displays, generally they have excellent reliability. Since the frequency response of the sine and cosine function generator directly determines the accuracy of a display, electromechanical resolvers are considered to be unacceptable in applications needing high display accuracy. Accordingly, it is an object of this invention to provide electronically generated resolved sweep signals for accurate radar display.

Another object of this invention is to provide electronically generated resolved sweep signals for reliable radar displays. A further object of this invention is to provide electronic multiplication for generating resolved sweep signals for radar display. A still further object of this invention is to provide electronic multiplication of the sine component and cosine component of the antenna position angle times a sweep voltage. Still another object of this invention is to provide electronic multiplication of bipolar analog signals. An additional object of this invention is to provide electronic multiplication for signals of positive, negative, or zero amplitudes.

In accordance with the present invention, resolved sweep signals for a scanning radar are electronically generated from a sine component signal and a cosine component signal of the antenna position angle and a radar sweep signal. Both the sine component signal and the cosine component signal are individually multiplied by the radar sweep signal in separate multipliers. The multiplier generates first and second voltages at an amplitude determined by the sine component signal (or the cosine component signal), the radar sweep signal, and a bias reference voltage. The first and second voltages are connected to a differential amplifier to produce the horizontal (or vertical) resolved sweep signal that equals the product of the sine component signal and the radar sweep signal (or the cosine component signal and the radar sweep signal). To compensate for line voltage variation, the line voltage and the radar sweep signal are connected to a multiplier to produce a modified radar sweep signal that compensates for gradients in the sine and cosine component signals due to line voltage variation.

Further, in accordance with this invention, two analog signals, either of which may be bipolar, are electronically multiplied. The multiplier consists of a first differential amplifier pair connected push-pull to a second differential amplifier pair. Current flow in the first amplifier pair is controlled by a first current source responsive to the radar sweep signal plus a bias reference voltage. The second amplifier pair also connects to a current source, controlled by a reference bias voltage.

A more complete understanding of the invention and its advantages will be apparent from the specification and claims and from the accompanying drawings illustrative of the invention.

Referring to the drawings.

Figure 1:
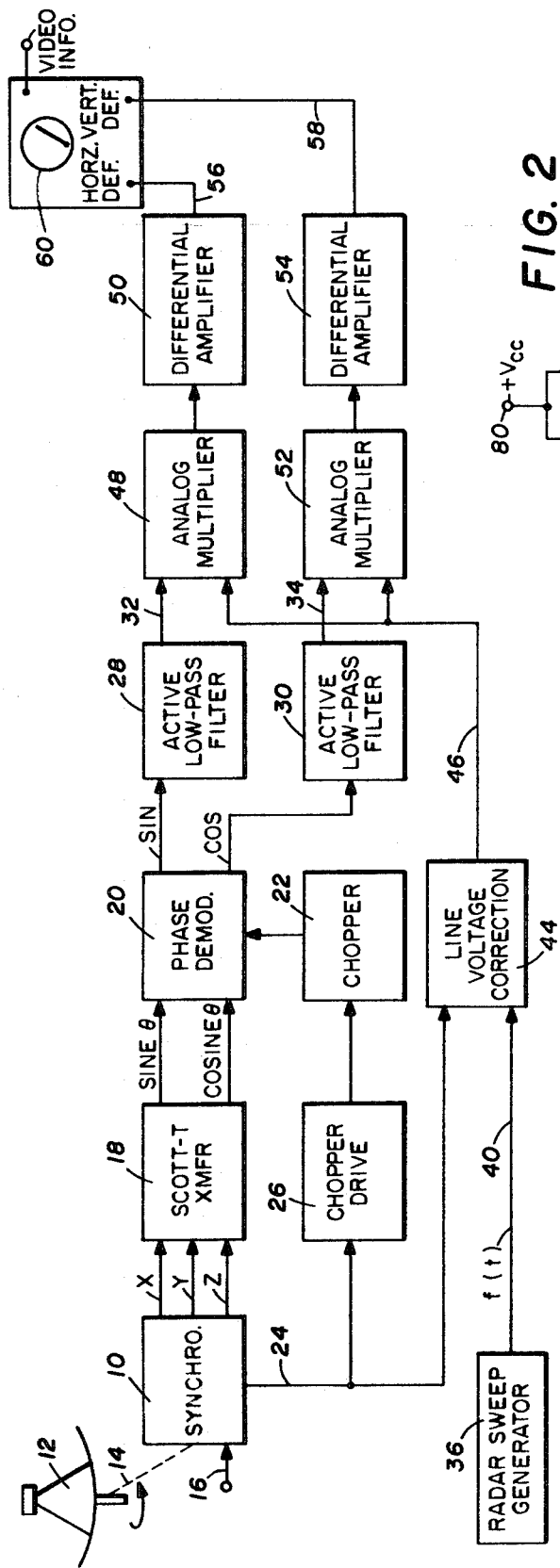
FIG. 1 is a block diagram of a system for electronically generating resolved sweep signals for a scanning radar display.

Referring to the drawings, FIG. 1 illustrates a scanning radar system wherein a synchro 10 generates three-phase angular data of the position of an antenna 12. In the usual manner, the synchro 10 is coupled to the antenna 12 through a mechanical linkage 14 and energized by a voltage on the line 16.

To convert the three-phase synchro data into a sine component signal and a cosine component signal, the three outputs of the synchro 10 are connected to a Scott-T transformer 18. Scott-T transformer operation is believed to be sufficiently well understood such that additional description will not be given. Basically, it converts the three-phase data from the synchro 10 into two component signals related to the position of the antenna 12 as it scans. These two components are the sine component the antenna position angle and the cosine component of the antenna position angle.

Although a synchro and Scott-T transformer are shown, it should be understood that such components are not necessary for all radar scan systems. In some systems, the sine component and the cosine component are generated directly, thus eliminating the need for a synchro and a three-phase converter.

Next, the sine component and cosine component signals are demodulated to remove the carrier frequency in a phase demodulator 20 connected to the Scott-T transformer 18. In the phase demodulator 20, the sine component and cosine component signals are chopped in a full wave chopper circuit 22 utilizing solid-state chopper circuitry. The excitation drive to the chopper transistors is derived from the synchro excitation voltage on the line 24. The excitation voltage is phase shifted in a chopper drive 26 to match the carrier phase shift of the synchro voltages, and converted to a square wave utilizing an open loop integrated circuit amplifier.

The full wave demodulated envelopes of the sine and cosine components are then filtered individually in respective low pass filters 28 and 30 to remove the ripple frequency generated in the demodulation process. Active low pass filters are utilized in order to provide a high attenuation at the ripple frequency while maintaining extremely low phase shifts at the modulation frequencies. Typically, 0.5 ms. phase lag is obtained at 1 cycle per second. In order to compensate for any possible phase lag problems, a phase lead network is utilized at the input to the low pass filter 28 for the sine component to provide adjustment for any small lateral target shift on the display.

The function of the demodulator-filter combination is to generate DC analog signals representing the sine and cosine components of the angle input data generated by the synchro 10. Thus, there is produced on a line 32, a smoothly varying voltage representing the sine component of the antenna angle position, and a second smoothly varying voltage on a line 34 representing the cosine component of the antenna angle.

The three-wire data from the synchro 10 is line voltage sensitive and, consequently, the smoothly varying signals on the lines 32 and 34 are also line voltage sensitive. Since the gradients of the sine and cosine components are functions of the gradient of the three-wire synchro, a means of correcting for a gradient change due to line voltage variation is required. A radar sweep generator 36, synchronized to the radar transmitter (not shown), produces the sweep voltage ($f[t]$) on a line 40. The sweep voltage (range voltage versus time) on line 40 connects to one input of a line voltage corrector 44. The second input to the voltage corrector 44 is the synchro excitation voltage on line 24. The purpose of the line voltage corrector 44 is to increase or decrease the sweep voltage amplitude in a manner proportional to any line voltage decrease or increase that might occur, in order to maintain a sweep voltage signal on the line 46 that varies in accordance with line voltage variation. Circuitry for accomplishing the line voltage correction may be a differential amplifier with the two stages interconnected to a controllable current source (as will be explained). The voltage on line 24 is rectified, filtered, and applied to one input of the differential amplifier and the sweep voltage ($f[t]$) applied to the current source to control the current through the differential amplifier. These two inputs are thus combined to produce a modified sweep voltage on the line 46 that varies inversely in accordance with line voltage variation for the synchro 10.

Resolved sweep horizontal and vertical scanning signals may now be generated from the sine component signal on line 32, the cosine component signal on line 34, and the modified sweep voltage signal on line 46. A horizontal sweep voltage is generated in accordance with the present invention by an analog multiplier 48 and a differential amplifier 50. Similarly, a vertical sweep voltage is generated by means for an analog multiplier 52 followed by a differential amplifier 54. The inputs to the multipliers are the sine $\theta$ and the cosine $\theta$ and the sweep voltage ($f[t]$), where $\theta$ is the angle of the antenna 12. These inputs are multiplied to obtain the product function:

K sine $\theta \cdot f(t)$ and      (1)
K cosine $\theta \cdot f(t)$      (2)

on lines 56 and 58, respectively, connected to the horizontal deflection plates and the vertical deflection plates of a cathode-ray tube 60.

Figure 2:
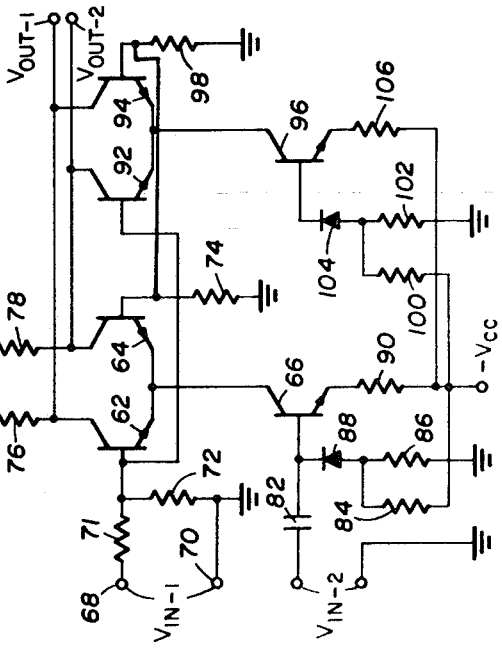
FIG. 2 is an electrical schematic of a bipolar analog signal multiplier.

Multiplier circuits in the analog multipliers 48 and 52 utilize two differential amplifiers connected push-pull and driven independently from separate current sources. Such circuits will multiply a first input voltage ($V_{in-1}$) times a second input voltage ($V_{in-2}$), with the output product function appearing as a differential voltage at a pair of output terminals. Referring to FIG. 2, there is shown the schematic of an analog multiplier in accordance with this invention where the first differential amplifier pair includes transistors 62 and 64 having a common emitter electrode connection to a current source including a transistor 66. Transistor 62 of the first differential amplifier is driven from a base electrode connection to the first input voltage $V_{in-1}$ connected to an input terminal pair 68 and 70. A base drive resistor 71 and a resistor 72 form a voltage attenuator to the input voltage $V_{in-1}$. The interconnection of these two resistors connects to the base electrode of transistor 62. The second transistor of the first differential amplifier pair includes a base electrode connection to ground through a base resistor 74. Each of the transistors 62 and 64 has a collector electrode tied to individual output resistors 76 and 78, respectively. Resistors 76 and 78 are interconnected to the positive terminal 80 of a direct current bias source (not shown).

The current drive for the first differential amplifier pair includes the transistor 66 having a base electrode connected to a reference bias voltage and the second input $V_{in-2}$ through a coupling capacitor 82. The reference bias voltage is developed at the interconnection of resistors 84 and 86 of a voltage divider network connected between the negative terminal of a direct current source and ground. A diode 88 couples the bias reference voltage to the base electrode of the transistor 66. An emitter bias is provided for the transistor 66 by a bias resistor 90 connected to the negative terminal of a direct current supply (not shown).

The output voltage of the first differential amplifier pair represents the multiplication product of the two input voltages and an unwanted term containing only the first input voltage $V_{in-1}$. This unwanted term is eliminated by connecting a second differential amplifier pair in push-pull to the first multiplier pair. The second differential amplifier pair consists of transistors 92 and 94 having interconnected emitter electrodes coupled to a current source including a transistor 96. Transistor 92 of the second differential amplifier pair connects to the base electrode of the transistor 62 and the first input voltage $V_{in-1}$ functions as a base drive voltage. Transistor 94 of the second differential amplifier pair is tied to ground through a resistor 98. The transistors 92 and 94 have collector electrodes individually connected to the resistors 78 and 76, respectively. Thus, the two differential amplifier pairs have the first transistor thereof connected to the first input voltage and the second transistor thereof coupled to ground. The first transistor of the first pair and the second transistor of the second pair connect to the output resistor 76, and the second transistor of the first pair and the first transistor of the second pair connect to the output resistor 78.

Current through the second differential amplifier pair is controlled by the transistor 96 having a base drive circuit consisting of a divider network of resistors 100 and 102 and a diode 104. The bias drive circuit for transistor 96 is similar to the drive for supplying the bias reference voltage for the transistor 66. Both the transistors 66 and 96 are biased at the same level (with $V_{in-2}=0$) to produce identical currents through the respective differential amplifier pair. Transistor 96 includes an emitter electrode connected to the negative terminal of a direct current source (not shown) through an emitter resistor 106.

The operation of the multiplier illustrated in FIG. 2 will be analyzed from a functional standpoint by examining three cases. To operate in accordance with the following description, the transistors 62 and 64 must present a balanced pair and the resistors 76 and 78 must have equal resistance. In addition, the transistors 92 and 94 must be a balanced pair. In the first case, consider that the two input voltages $V_{in-1}$ and $V_{in-2}$ are zero. The current source transistors 66 and 96 are each conducting in accordance with the bias reference voltage connected to the base electrodes, and provide equal current for both differential amplifier pairs. With balanced transistor pairs (62 and 64) and (92 and 94) and with resistors 76 and 78 equal, each of the transistors of the first differential amplifier pair will be conducting at a level such that the current flow through the resistors 76 or 78 will be equal to one-half that provided by the transistor 66 and one-half that provided by the transistor 96. Thus, the current through resistor 76 will be equal to the current through the transistors 62 and 94, and the current through resistor 78 will be equal to that in the transistors 64 and 92. If equal currents flow through the resistors 76 and 78, equal voltage drops will be developed across these resistors and the output voltages $V_{out-1}$ and $V_{out-2}$ will be equal and the difference will be zero. This is the desired output for the multiplication of $V_{in-1}$ and $V_{in-2}$ when both are zero.

In case two, the first input voltage $V_{in-1}$ will be assumed to be a variable the second input voltage $V_{in-2}$ will be assumed to be zero. With the input voltage $V_{in-2}$ equal to zero, the current established in the differential amplifiers by the transistors 66 and 96 will again be equal. As the first input voltage $V_{in-1}$ varies in a positive direction, the transistor 62 will conduct more while the transistor 64 conducts less. At the same time, the current in transistor 92 increases while the current in transistor 94 decreases. Since the current in the resistor 76 is equal to the sum of that in transistors 62 and 94, and since the current in the resistor 78 is equal to that in the transistors 64 and 92, the total current in each of these resistors remains constant regardless of how the input voltage $V_{in-1}$ varies when $V_{in-2}$ equals zero. The delta increase of current in one transistor in each pair is equal to the same delta decrease in the other transistor. Thus, the currents in the resistors 76 and 78 will remain equal and constant. Again, equal voltage drops will be developed across the resistors 76 and 78 and the difference between the output voltages $V_{out-1}$ and $V_{out-2}$ will be zero. This is the desired result when multiplying $V_{in-1}$ and $V_{in-2}$ when one of the two equals zero.

For the third case, the first input voltage $V_{in-1}$ will be assumed to be zero, while the second input voltage $V_{in-2}$ will be assumed to be a variable. Since the first input voltage $V_{in-1}$ is equal to zero, the current established in the first differential amplifier pair by the transistor 66 will divide equally between transistors 62 and 64. Similarly, the current p provided by the transistor 96 will be split equally between the transistors 92 and 94. As the second input voltage $V_{in-2}$ increases, the transistor 66 is driven further into conduction, thereby supplying an increase of current to the first differential amplifier pair. The current supplied by the transistor 96, of course, will remain fixed at the level established by the reference bias voltage. Thus, as the second input voltage $V_{in-2}$ increases, the current in the resistors 76 an 78 likewise increases, however, the increases will be equal. Voltage drops developed across the resistors 76 and 78 will again be equal and the difference in the output voltages $V_{out-1}$ and $V_{out-2}$ will be zero.

By extending the above three cases to the situation where both inputs vary, it can be readily understood that the voltage difference between $V_{out-1}$ and $V_{out-2}$ will be the product of the input voltages $V_{in-1}$ and $V_{in-2}$.

Figure 3:
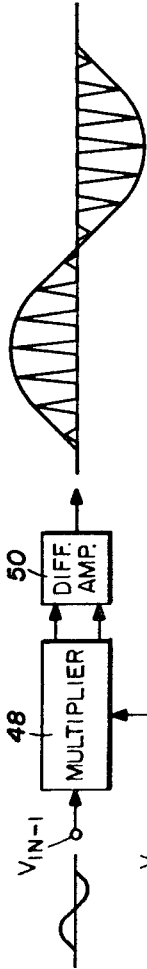
FIG. 3 is a section of the block diagram of FIG. 1 including input and output waveforms of the multiplicand, the multiplier, and the product.

Referring to FIG. 3, there is shown a block diagram of the multiplier 48 and the differential amplifier 50 where the multiplier includes the circuit of FIG. 2. The first input voltage $V_{in-1}$ is the sine component of the antenna angle position and the second input voltage $V_{in-2}$ is the sweep voltage $f(t)$. The first input voltage varies in a smooth sinusoidal function and the second input voltage consists of a train of short rapidly occurring sweep waveforms. The product of these two functions, as it appears at the output of the differential amplifier 50, is a resolved sweep signal having the general outline of a sine function. This sine function consists of the closely spaced pulses of $V_{in-2}$ with each adjacent pulse having an amplitude either greater than or less than the preceding. The peaks of the pulses form a curve represented by a sine function. This sine function is the horizontal resolved sweep signal coupled to the horizontal deflection plates of the display tube 60.

In a similar manner, the multiplier 52 includes the circuit of FIG. 2 with the output of the differential amplifier 54 providing the vertical resolved sweep signal for the vertical deflection plates of the display tube 60.

By using the first differential amplifier pair of the multiplier illustrated in FIG. 2 with its associated current drive source, line voltage correction can be accomplished. The line voltage corrector 44 would utilize only the first differential amplifier pair along with the associated current source. The line voltage would be connected as the first input voltage $V_{in-1}$ and the sweep function on line 40 the second input voltage $V_{in-2}$. The second amplifier pair is not required since the unwanted product term in line correction is a DC voltage that can be eliminated by a coupling capacitor.

In addition to being useful in a generation of resolved sweep signals, the multiplier of FIG. 2 is readily adaptable to many other applications requiring a multiplication process. Specifically, this multiplier could be used in industrial control systems where multiplication of two bipolar signals is required. In addition, multipliers are also utilized in analog computers and servomechanism systems, to point out a few.

While the invention has been described in its preferred embodiments, it will be evident that various modifications are possible without departing from the scope of the invention as set forth in the appended claims.

What is claimed is:

1. A method of electronically generating resolved sweep signals for a radar display comprising:
   generating a sine component signal of the position angle of a radar antenna,
   generating a cosine component signal of the position angle of the radar antenna,
   generating a radar sweep signal,
   multiplying the sine component signal by the radar sweep signal to produce a horizontal resolved sweep signal, and
   multiplying the cosine component signal by the radar sweep signal to produce a vertical resolved sweep signal.

2. A method of electronically generating resolved sweep signals as set forth in claim 1 including the step of correcting for line voltage variations prior to multiplying the sine and cosine component signals by the sweep signal.

3. A method of electronically generating resolved sweep signals as set forth in claim 2 including the steps of:
   filtering the sine component signal to produce a smoothly varying DC signal proportional to the position angle of the radar antenna for multiplication with the sweep signal, and
   filtering the cosine component signal to produce a smoothly varying DC signal proportional to position angle of the radar antenna for multiplication with the sweep signal.

4. A method of electronically generating resolved sweep signals for a radar display comprising:
   generating a sine component signal of the position angle of a radar antenna,
   generating a cosine component signal of the position angle of the radar antenna,
   generating a radar sweep signal,
   producing a first voltage at a level determined by the since component signal, the radar sweep signal, and a bias reference signal,
   producing a second voltage at a level determined by the since component signal, the radar sweep signal, and the reference bias signal,
   differentially combining the first and second voltages to produce a horizontal resolved sweep signal equal to the product of the sine component signal and the radar sweep signal,
   producing a third voltage at a level determined by the cosine component signal, the radar sweep signal, and the bias reference signal,
   producing a fourth voltage at a level determined by the cosine component signal, the radar sweep signal, and the reference bias signal, and
   differentially combining said third and fourth voltages to produce a vertical resolved sweep signal equal to the product of the cosine component signal and the radar sweep signal.

5. A method of electronically generating resolved sweep signals as set forth in claim 4 including the step of multiplying a line voltage and the radar sweep signal to produce a modified radar sweep signal to compensate for gradients in the sine and cosine component signals due to line voltage variation.

6. A method of electronically generating resolved sweep signals as set forth in claim 5 including the step of:
   filtering the sine component signal to produce a smoothly varying DC signal proportional to the position angle of a radar antenna for multiplication with the sweep signal, and
   filtering the cosine component signal to produce a smoothly varying DC signal proportional to the position angle of a radar antenna for multiplication with the sweep signal 7. A method of electronically generating resolved sweep signals as set forth in claim 6 wherein the sine component signal and the cosine component signal are generated by combining three-pulse angular data of antenna position in a Scott-T transformer configuration.

8. Apparatus for electronically generating resolved sweep signals for a radar display from a sine component signal and a cosine component signal of the position angle of a radar antenna, and a radar sweep signal, comprising:
   means for generating first and second voltages, each at a level determined by the sine component signal, the radar sweep signal, and a bias reference signal,
   differential amplifier means connected to said generating means for differentially combining said first and second voltages to produce a horizontal resolved sweep signal equal to the product of the sine component signal and the radar sweep signal, means for generating a third and fourth voltage, each at a level determined by the cosine component signal, the radar sweep signal, and a bias reference signal, and differential amplifier means connected to said second generating means for differentially combining said third and fourth voltages to produce a vertical resolve sweep signal equal to the product of the cosine component signal and the radar sweep signal.

9. Apparatus for electronically generating resolved sweep signals as set forth in claim 8 including means for multiplying a line voltage and the radar sweep signal to produce a modified radar sweep signal to compensate for gradients in the sine and cosine component signals due to line voltage variation.

10. Apparatus for electronically generating resolved sweep signals as set forth in claim 9 wherein said first and second generating means include:

a first differential amplifier connected to the respective angle component signal, the radar sweep signal and a bias reference signal, and a second differential amplifier connected in push-pull arrangement with the first differential amplifier and connected to the respective angle component signal and a bias reference signal.

11. Apparatus for electronically generating resolved sweep signals as set forth in claim 10 wherein each of said generating means further includes:

a first controlled current source connected to the radar sweep signal and the bias reference signal for controlling the current through the first differential amplifier, and a second controlled current source connected to the bias reference signal for controlling the current through the second differential amplifier.

12. Apparatus for electronically generating resolved sweep signals as set forth in claim 9 wherein said multiplying means includes a differential amplifier connected to a controlled current source, with the line voltage as the input to the differential amplifier, and the radar sweep signal as the input to the control current source.

13. Apparatus for electronically generating resolved sweep signals as set forth in claim 12 including means for converting three-phase angular data of antenna position into a sine component signal and a cosine component signal.

14. Apparatus for electronically generating resolved sweep signals as set forth in claim 13 including:

means for filtering the sine component signal to produce a smoothly varying DC signal proportional to the position angle of the radar antenna, and means for filtering the cosine component signal to produce a smoothly varying DC signal proportional to the position angle of the radar antenna.

15. A bipolar analog signal multiplier for multiplying a first analog signal by a second analog signal comprising:

a first differential amplifier pair having one amplifier of said pair connected to a fixed reference and the second amplifier including circuitry for receiving the first of two analog signals, a second differential amplifier pair having one amplifier of said pair connected to a fixed reference and the second amplifier including circuitry for receiving the first of the two analog signals, a first control current source connected to said first differential amplifier pair and including circuitry for receiving the second of the two analog signals and a bias reference signal for controlling the current through the first amplifier pair in accordance with the second analog signal, a second control current source connected to said second differential amplifier pair and to a bias reference signal for establishing a fixed current through said second differential amplifier pair, a first output circuit connected to the first amplifier of said first amplifier pair and the second amplifier of said second amplifier pair for generating a signal proportional to the current through said amplifiers, and a second output circuit connected to the second amplifier of said first amplifier pair and the first amplifier of said second amplifier pair for generating a signal proportional to the current through said amplifiers, the difference between the signals generated by said first and second output circuits representing the product of the two analog signals.

16. A bipolar analog signal multiplier as set forth in claim 15 wherein said second differential amplifier pair is connected push-pull with said first differential amplifier pair.

17. A bipolar analog signal multiplier as set forth in claim 16 wherein said differential amplifier pairs each include a set of balance transistors having a common emitter connection to the respective current sources.

18. A bipolar analog signal multiplier as set forth in claim 17 wherein said first and second control current sources include individual transistors connected to the common emitter connection of the respective differential amplifier pair.